(12) United States Patent
Anozie

(10) Patent No.: US 6,400,822 B1
(45) Date of Patent: Jun. 4, 2002

(54) LINEAR, OPTICAL COUPLED LINE IMPEDANCE CIRCUIT

(75) Inventor: Uzoma Olugbo Anozie, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/957,916

(22) Filed: Oct. 27, 1997

(51) Int. Cl.[7] .............................................. H04M 7/04
(52) U.S. Cl. ........................ 379/398; 379/394; 379/414
(58) Field of Search ............................. 379/93.28, 403, 379/414; 375/224

(56) References Cited

U.S. PATENT DOCUMENTS

| | | | | |
|---|---|---|---|---|
| 5,734,703 A | * | 3/1998 | Hiyoshi .................... | 379/93.28 |
| 5,784,406 A | * | 7/1998 | Dejaco et al. .............. | 375/224 |
| 6,111,949 A | * | 8/2000 | Sheets et al. ............... | 379/414 |
| 6,205,218 B1 | * | 3/2001 | Fischer et al. .............. | 379/403 |

* cited by examiner

Primary Examiner—Forester W. Isen
Assistant Examiner—Jefferey Harold
(74) Attorney, Agent, or Firm—William B. Kempler; Frederick J. Telecky, Jr.; W. James Brady

(57) ABSTRACT

A system and method for matching a device to a transmission line are disclosed. A matching circuit having optically coupled devices is biased so that harmonics of a reference signal, such as a dial tone, are eliminated. Suppression of the reference signal harmonics indicates a correct impedance match between the matching circuit and the transmission line. The matching circuit also provides two-wire to four-wire conversion. After the matching circuit's impedance is adjusted, the circuit gain is balanced and the circuit is further biased to eliminate echoes. The impedance matching and circuit biasing operations are controlled by a digital signal processor. Before data or other signals are processed by the digital signal processor, an inverse transfer function is derived for the matching circuit. Received signals are convolved with the inverse transfer function to compensate for matching circuit distortion. Also, transmitted signals are predistorted before they are transmitted through the matching circuit in order to provide an undistorted signal at the transmission line.

27 Claims, 8 Drawing Sheets

LINEAR, OPTICAL COUPLED LINE IMPEDANCE CIRCUIT

BACKGROUND OF THE INVENTION

It is well-known that transmission lines have an inherent impedance and that devices, such as telephones, modems or signal processors, which are connected to transmission lines must match the transmission line impedance to reduce signal attenuation and reflection. In telephone systems there is a requirement that devices which are coupled to telephone lines must provide isolation between the device and the central office. Typically, prior art systems provided isolation by using a transformer between the telephone line and the device. The telephone line is usually connected to the primary side of the transformer and the device is on the secondary side. Signals from the transmission line and from the device are coupled across the transformer so that current does not flow directly from the device to the central office.

Instead of using a transformer to couple a device to a transmission line, some prior art systems use optically coupled circuits to provide the required isolation. This type of system is disclosed in U.S. Pat. Nos. 4,190,747 and 4,228,323, both to Feiner et al., the disclosure of which is hereby incorporated by reference. Optically coupled systems use photoemitters and photodetectors to couple the two sides of the circuit using light waves.

In the prior art transformer coupled and optically coupled devices there is still a need to provide impedance matching between the device and the transmission line. Typically, the impedance matching is accomplished by a matching circuit having discrete components that are selected to match an expected transmission line impedance to an expected coupling circuit impedance. These prior art circuits require the circuit designer to have a fairly accurate measurement of the transmission line impedance in order to properly match the device to the transmission line. If the device is connected to a different transmission line or if the transmission line impedance is not measured properly, then the matching circuit will be designed for the wrong impedance values and the circuit is likely to cause signal attenuation and reflection. A telephone line impedance is typically 600 $\Omega\pm10\%$. The variation in impedance may be significant enough on different transmission lines to require modifying the matching circuit each time the device is attached is attached to a different transmission line.

Received and transmitted signals that pass through matching circuits are distorted by the transfer function of the matching circuit. If the matching circuit is adjusted for a new transmission line impedance, then the transfer function for the matching circuit will change. Therefore, each time a device is connected to a different transmission line, the matching circuit must be adjusted for the new transmission line impedance to achieve a perfect match and the transfer function must be recalculated for the modified matching circuit.

SUMMARY OF TIE INVENTION

The present invention provides a system and method in which an optically coupled circuit provides an impedance match between a transmission line and another device, such as a telephone, modem or digital signal processor. The matching circuit is comprised of optical couplers which provide the required isolation between the transmission line and the device. In the prior art isolation circuits, the device on the secondary side cannot directly measure the impedance on the transmission line side of the isolation circuit because of the isolation across the transformer or the optical couplers.

In the present invention, a processor, such as a digital signal processor, monitors the signals that pass from the transmission line through the isolation and matching circuitry. A reference signal, such as a central office dial tone, is provided on the transmission line. The reference signal is detected by the processor after it passes through the matching circuit. It has been determined that harmonics of the reference signal are created when the matching circuit is not properly matched to the transmission line impedance. These harmonic signals appear at the output of the matching circuit. The processor detects these harmonic signals and adjusts the matching circuit impedance by varying the bias voltages of one or more optical couplers. The bias is adjusted in discrete steps and the processor monitors the amplitude of the harmonic of the reference signal at each step. The processor continues to adjust the optical coupler bias until the harmonic signals are driven to a minimum level. The processor also measures the noise level in the system. In the best case, the harmonics will be reduced to the noise level by the matching circuit.

The processor calibrates and balances the transmission and receive portions of the matching circuit after the harmonics are driven to a minimum level. Tide processor monitors the harmonic signal amplitude while balancing the circuit to ensure that the harmonics remain at a minimum level, preferably at or below the noise level.

After balancing the circuit, the processor transmits a signal into an input of the matching circuit and detects an echo at an output of the matching circuit. The processor then adjusts the gain in the transmission and receive paths to suppress echo signals from the receive output. Gain in the transmission and receive circuits can be adjusted by changing the resistance of a variable resistor or by varying the gain in a coder/decoder (codec) channel coupled between the matching circuit and the processor.

The matching circuit of the present invention also performs two-wire to four-wire conversion for signals that are received from a telephone line. The two-wire telephone line connection is converted to a four-wire connection for the processor. The four-wire connection has a dedicated transmit and receive lines, while the two-wire connection carries both transmitted and received signals. A codec is coupled to the four-wire output of the matching circuit to convert between the analog signals carried by the transmission line and the corresponding digital signals that are processed by the processor.

The transfer function of the optically coupled matching circuit can be determined after the matching circuit has been matched to the impedance of the transmission line and the transmission and receive circuit gains have been balanced and corrected for signal echo. Using the transfer function, received and transmitted signals can be modified to compensate for signal distortion caused by the matching circuit. The processor can determine the matching circuit transfer function by generating an impulse and transmitting the impulse into the matching circuit. The corresponding signal that appears at the receive output is sampled to determine an impulse response of the matching circuit.

The frequency domain transfer function for the matching circuit is derived by performing a Fourier transform on the impulse response in the processor. By inverting the frequency domain transfer function and performing an inverse Fourier transform on the frequency domain transfer function, the processor can generate a time domain transfer function that is the inverse of the matching circuit transfer function. Signals from the transmission line will distorted as they pass through the matching circuit. The processor can recover the original signal by convolving a distorted signal with the inverse transfer function so that the effects of the matching circuit transfer function are canceled. In a similar manner, signals transmitted by the processor can be predistorted in the processor using the inverse transfer function so that signals appearing on the two-wire side of the matching circuit are undistorted.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1A:
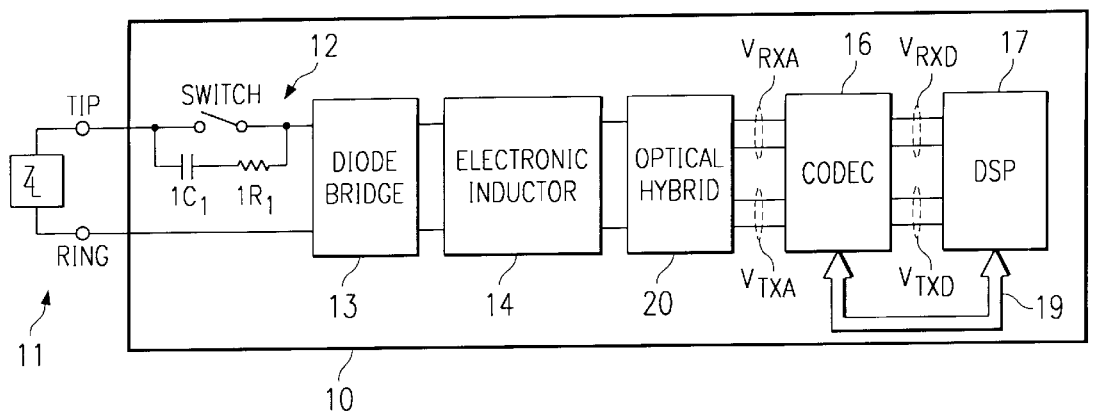
FIG. 1A is a high level block diagram of a system incorporating the present invention.

FIG. 1A shows a high level block diagram of a system 10 which incorporates the present invention. Telephone line 11 is attached to system 10 through switch 12. In the preferred embodiment, switch 12 is a standard, well-known relay for connecting devices to a telephone line. When switch 12 is closed system 10 is connected to telephone line 11 and system 10 is said to be off-hook. Switch 12 is coupled to diode bridge 13 which is used to adjust for the polarity of the signal on telephone line 11. Typically, the central office provides a signal at −52 or −58 volts, but the signal can be presented on either line. The purpose of diode bridge 13 is to ensure that the signal that is passed to electronic inductor 14 and the remainder of system 10 is biased correctly and always has the same polarity.

Figure 1B:
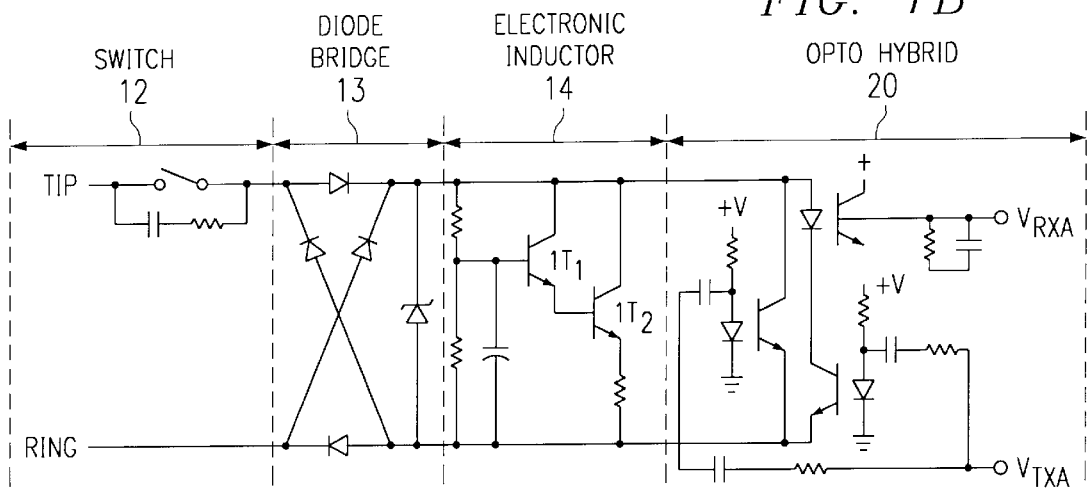
FIG. 1B is a schematic diagram of the components that comprise a portion of the system shown in FIG. 1A.

Electronic inductor 14 provides a load for telephone line 11 when the circuit goes off hook. FCC specifications require that circuits draw a minimum amount of current when they attach to a telephone line. Electronic inductor 14 provides a current load so that the central office (not shown) knows that system 10 has been connected to telephone line 11. Switch 12, diode bridge 13 and electronic inductor 14 are all well known in the art and in the preferred embodiment standard, off-the-shelf circuits are used for these elements. For example, diode bridge 13 may be embodied as a Motorola diode bridge (part number AXIN5820) and transistors 1T1 and 1T2 of electronic inductor 14 (FIG. 1B) may be embodied as Motorola transistors (part numbers MPSA20 and 2N2201).

Optical hybrid 20 provides impedance matching and isolation for system 10. Telephone line 11 has an impedance $Z_L$. As will be discussed below with respect to FIG. 2, optical hybrid 20 provides a means of changing the effective impedance of system 10 so that it matches impedance $Z_L$ of telephone line 11. When system 10 is connected to telephone line 11, optical hybrid 20 first performs an impedance matching adjustment operation so that the impedance of system 10 matches the impedance $Z_L$ of telephone line 11. Optical hybrid 20 uses the frequency and amplitude of the central office dial tone as a reference for matching system 10 to telephone line 11.

The central office typically provides a dial tone which fits a specified template. For example, in the United States, the dial tone provided by the central office is comprised of two tones at 350 Hz and 440 Hz having a signal strength of −13 dB ±1 dB. The dial tone signal also contains harmonics of the fundamental frequencies. These would appear at 700 Hz and 880 Hz for the first harmonics (twice the fundamental frequencies), 1050 Hz and 1320 Hz for the second harmonics and so on. In the typical dial tone template, the signals at the harmonic frequencies are at −65 dB in the signal provided by the central office.

The dial tone template represents the amplitudes and frequencies of the signals on telephone line 11, and in system 10, if everything is perfectly matched when switch 12 goes off-hook. In the ideal situation, only the fundamental dial tone frequencies would be detectable in system 10 and the harmonics would be at the noise level. However, when the impedance match between circuit 10 and telephone line 11 is not perfect, then harmonics of the fundamental dial tone frequencies can be detected in system 10. Optical hybrid 20 uses the known central office dial tone template in connection with any detectable dial tone harmonics to determine if system 10 is matched to telephone line 11.

Optical hybrid 20 performs the combined functions of a transformer and a two-to-four wire convertor. Prior art systems include a transformer which is typically connected to electronic inductor 14 to provide isolation between telephone line 11 and devices that are attached to line, such as a modem or digital signal processor (DSP) 17. The FCC requires 1.5 kV of isolation between the telephone line on the primary side of the transformer and the device attached to the secondary side. Optical couplers provide the required isolation in the present invention.

Prior art systems also include a two-wire to four-wire convertor which serves as an interface between two wire telephone line 11 and four wire devices, such as coder/decoder (codec) 16 and DSP 17. The prior art two-wire to four-wire convertors also provide echo cancellation on the four-wire side so that signals that are transmitted, for example by a DSP, do not appear as echoes on the receive line of the four-wire side. In the present invention, optical hybrid 20 provides echo cancellation so that signals transmitted by DSP 17 on transmit lines $V_{TXA}$ are not returned as an echo to DSP 17 on receive lines $V_{RXA}$.

Analog signals are carried on telephone line 11 and these analog signals pass through switch 12, diode bridge 13, electronic inductor 14 and optical hybrid 20 in system 10. The four wire, analog signal output of optical hybrid 20 is provided to codec 16. Codec 16 is a well-known, off-the-shelf circuit (such as Analog Device part number AD1843) which converts analog signals from optical hybrid 20 into digital signals that can be processed by DSP 17. Codec 16 performs analog-to-digital (A/D) and digital-to-analog (D/A) conversion on signals received from or transmitted to telephone line 11. Typically, codec 16 has two channels for both the receive and transmit signals. The gain on the channels can be adjusted to compensate for loss in system 10 or to balance the received and transmitted signals.

Optical hybrid 20 is controlled by DSP 17. DSP 17 is capable of generating signals to be transmitted through codec 16 into optical hybrid 20 on $V_{TXA}$. DSP 17 can also monitor signals from system 10 on lines $V_{RXA}$. Analog signals received from line 11 are converted into a digital signal by codec 16 and then processed by DSP 17. DSP 17 can be connected to a computer (not shown) via an RS-232 port or system 10 may be constructed as an internal card for a computer. A typical use for a DSP in a computer system is to perform modem functions. In the present invention, in addition to performing modem or other signal processing functions, DSP 17 also controls all the functions in optical hybrid 20, such as the impedance matching adjustment, gain calibration, echo cancellation, and circuit linearization. These functions are completed before DSP 17 performs the modem functions or other signal processing functions.

System 10 can be constructed as either a single device or as a series of discrete devices, In one embodiment, diode bridge 13, electronic inductor 14 and optical hybrid 20 can be constructed on one chip and codec 16 and DSP 17 can be separate devices. Optical hybrid 20 is capable of working with any DSP 17, such as Analog Devices part number AD2181DSP. All that is necessary is the ability to program DSP 17 with the proper instructions that would allow it to control hybrid 20 and to perform the matching, gain and linearization functions in the proper order before performing other signal processing functions.

Figure 2:
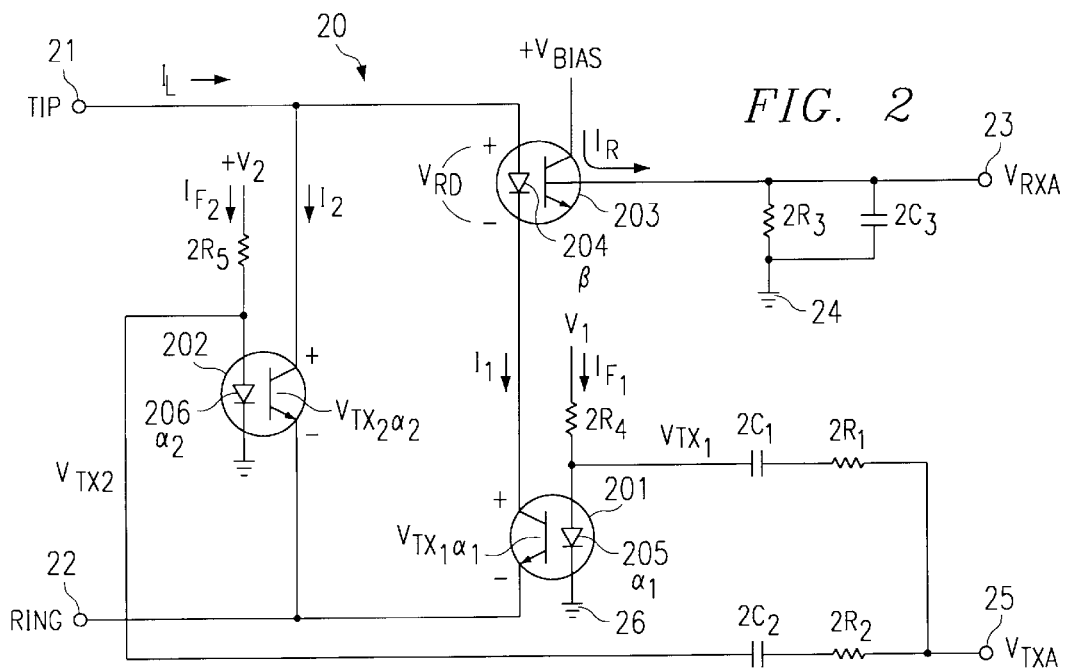
FIG. 2 is a schematic diagram of the optocoupled matching circuit of the present invention.

Turning now to FIG. 2, a schematic diagram of optical hybrid circuit 20 is shown. Hybrid 20 is connected on the left side to the two-wire telephone line Tip and Ring connections at nodes 21 and 22. The right side of hybrid 20 is a four-wire connection having receive signal node 23, ground 24, transmit node 25 and ground 26. In the preferred embodiment, ground 24 and ground 26 are at the same potential. Received signals, represented as $V_{RXA}$ are provided to codec 16 at node 23. Codec 16 converts the analog $V_{RXA}$ signals into digital signals $V_{RXD}$ (FIG. 1). Digital signals $V_{TXD}$ from DSP 17 pass through codec 16 and are presented to optical hybrid 20 at node 25 as analog transmission signal $V_{TXA}$.

Figure 3A:
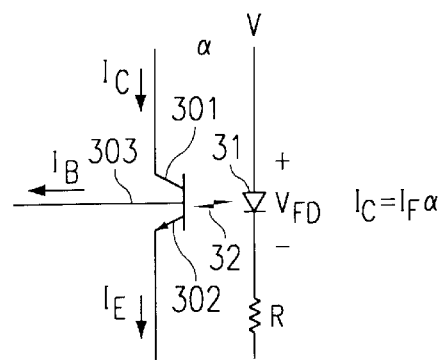
FIG. 3A is a schematic diagram of an optical coupler used in the present invention.

Optical hybrid circuit 20 is comprised of three optical couplers 201, 202 and 203. For illustration as to how optical couplers work, reference is made to FIG. 3A which shows optical coupler 30 having photodiode 31 and photodetector 32. Current $I_F$ flows through photodiode 31 generating light 32. Light 32 is detected by photodetector 33 inducing current $I_C$ and voltage $V_{CE}$ across collector 301 and emitter 302 of optical coupler 30. Since photoemitter 31 and photodetector 33 are separated, there is isolation between current $I_F$ and current $I_C$. This isolation is useful in telecommunications circuits for isolating telephone line 11 from DSP 17. If optical couplers are not used, then isolation must be provide by a transformer or other device.

In general, optical couplers have circuit characteristics that are similar to electronic transistors. This is shown by the graph in FIG. 3B which illustrates the relationship between current $I_C$ and voltage $V_{CE}$ for varying values of $I_F$.

Gain $\alpha$ of optical coupler 30 is dependent upon the distance between emitter 31 and detector 33. The relationship between $V_{CE}$ and $V_D$ is shown by the equation: $V_{CE}=V_D\cdot\alpha$. Similarly, $I_C=I_F\cdot\alpha$. Current $I_F$ can be represented as:

$$I_F = \left(\frac{V - V_{RD}}{R}\right)\alpha \qquad (1)$$

where $V_{FD}$ is the voltage across forward diode 31. When base 303 is not connected, such as in optical couplers 201 and 202, then all of current $I_C$ flows into collector 301 and out of emitter 303 as current $I_E$. If emitter 303 is not connected in the circuit, such as in optical coupler 203, then current $I_C$ flows out base 302 as current $I_B$.

Returning now to circuit 20 in FIG. 2, optical couplers 201, 202 and 203 have gains represented by $\alpha_1$, $\alpha_2$ and $\beta$ respectively. It will be noted in FIG. 2 that the bases of the photodetectors in optical couplers 201 and 202 and the emitter of the photodetector of optical coupler 203 are not connected in circuit 20. Noise in circuit 20 can be reduced by not bonding the unused connections in optical couplers 201, 202 and 203 to a connector. In the preferred embodiment, optical couplers 201, 202 and 203 are Motorola part number H11G1. The optical couplers are constructed on an FR4 substrate and consist of a separate photoemitter and photodector having a certain distance between them. The distance between the mounted photoemitter and photodetector will determine the gain of the optical coupler.

Transmit signal gain in circuit 20 is controlled by resistors 2R1 and 2R2. The values of 2R1 and 2R2 are variable and will be controlled by DSP 17 as described below. Resistors 2R1 and 2R2 can be embodied as discrete variable resistors that have a value controlled by DSP 17. In an alternative embodiment, the same effect can be accomplished in DSP software by controlling the gain of the transmit channels in codec 16. For example, one transmit channel in codec 16 having a first gain could provide a signal to 2C1 and another transmit channel could provide a second signal to 2C2 with a second gain. The gain of the codec channels could be controlled by DSP 17 to replace physical resistors 2R1 and 2R2. DSP 17 is connected to codec 16 via data bus 19 (FIG. 1). DSP 17 can provide a data word representing a gain value over bus 19 to codec 16. In response, codec 16 will set the gain on a selected channel to the value directed by DSP 17.

Coupling capacitors 2C1 and 2C2 provide AC coupling between circuit 20 and codec 16. The value of capacitors 2C1 and 2C2 are selected to provide a sufficiently wide bandwidth for circuit 20. It is desired that the bandwidth be greater that 4 kHz. Each series RC circuit, 2R1–2C1 and 2R2–2C2, has an impedance $Z_{RC}$. The values of 2C1 and 2C2 are selected so that the poles of $Z_{RC}$ allow a wide bandwidth. For example, in the preferred embodiment, the bandwidth is selected to be approximately 4.5 kHz.

On the receive side of the circuit, resistor 2R3 and capacitor 2C3 operate as a low pass filter. The values of 2R3 and 2C3 are selected so that there is a roll-off in the basspand above approximately 4 kHz. This provides noise suppression in the frequency range above 4 kHz.

Turning now to the voltages and currents in circuit 20, AC voltage $V_{RL}$ is presented across Tip 21 and Ring 22 and AC current $I_L$ represents the signal from telephone line 11. Current $I_L$ is divided into current $I_1$, through diode 204 of optical coupler 203 and current $I_2$ through the collector and emitter of optical coupler 202.

Forward diode 205 of optical coupler 201 receives DC current $I_{F1}$ which is generated by voltage $V_1$ and resistor 2R4. The AC voltage across forward diode 205 is represented as $V_{TX1}$. Using gain $\alpha_1$ for optical coupler 201, the AC voltage across the collector and emitter of optical coupler 201 is represented by $V_{TX1} \cdot \alpha_1$. Current $I_1$ can be determined by the relationship $I_{F1} \cdot \alpha_1$. Voltage $V_1$ is variable and controlled by DSP 17. This allows DSP 17 to control current $I_{F1}$ and thereby control current $I_1$ by changing the value of $V_1$.

Figure 6A:
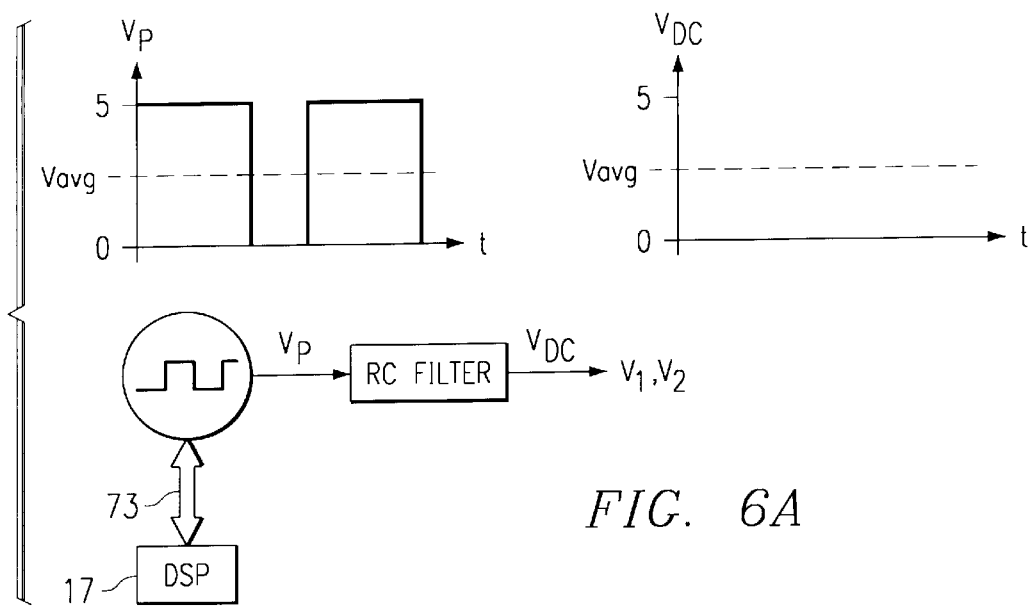
FIG. 6A shows one embodiment for generating the bias voltage in the present invention.

FIG. 6A shows one method of generating voltage $V_1$ using a pulse wave modulator. It is well-known that the output of a pulse wave modulator $V_P$ can be passed through an RC filter 72 to generate a constant DC voltage $V_{DC}$. The DC voltage $V_{DC}$ output from the RC filter is proportional to the average voltage of the pulse wave $V_{DC}$ that is generated in pulse wave modulator 71. By varying the frequency of the pulse wave $V_P$, the level of the DC output $V_{DC}$ can be varied and controlled. This configuration allows DSP 17 to precisely control the frequency of the pulse wave modulator in discrete steps. DSP 17 provides control inputs to pulse wave modulator 71L via data bus 73. The output of RC filter 72 can be provided as voltage $V_1$ or $V_2$. By altering the frequency of $V_P$, DSP 17 can precisely control the DC voltage $V_1$ that is applied to resistor 2R4. In turn, voltage $V_1$ and resistor 2R4 generate current $I_{F1}$ thereby allowing current $I_1$ to flow through optical coupler 201. Optical coupler 202 is controlled in a similar manner with DSP 17 controlling voltage $V_2$ and current $I_{F2}$ passing through forward diode 206, thereby allowing current $I_2$ to flow through optical coupler 202.

Figure 6B:
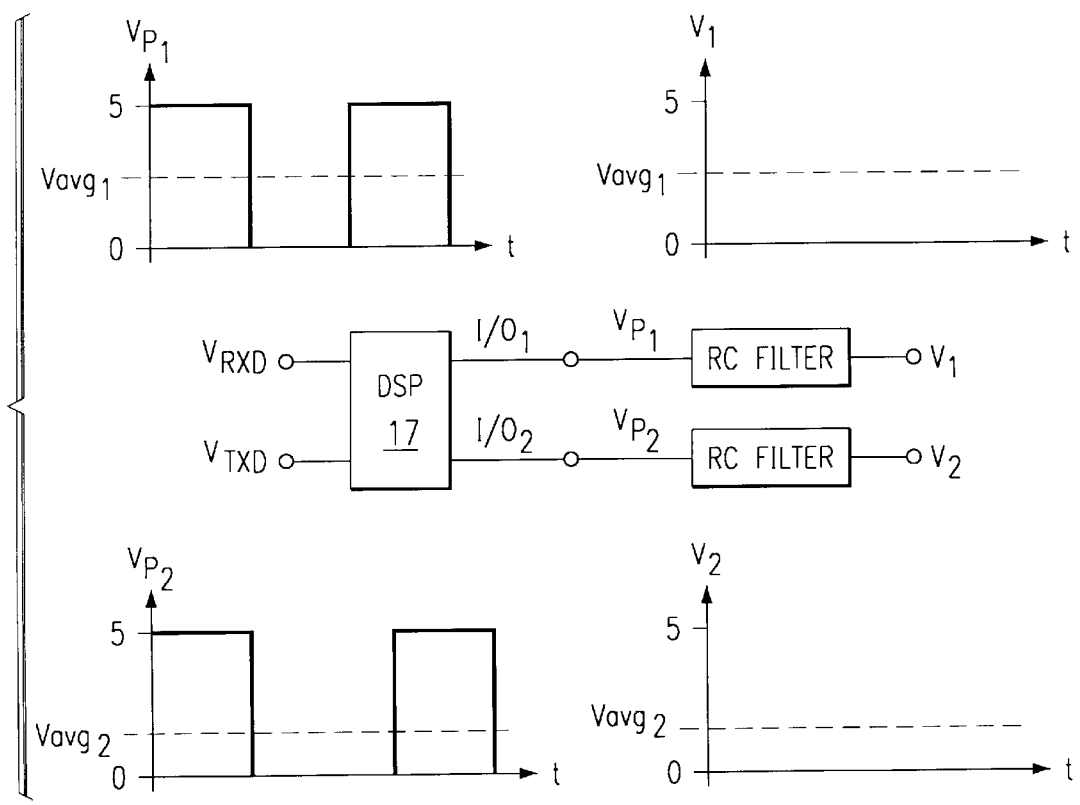
FIG. 6B shows a second embodiment for generating bias voltages in the present invention.
Figure 7A:
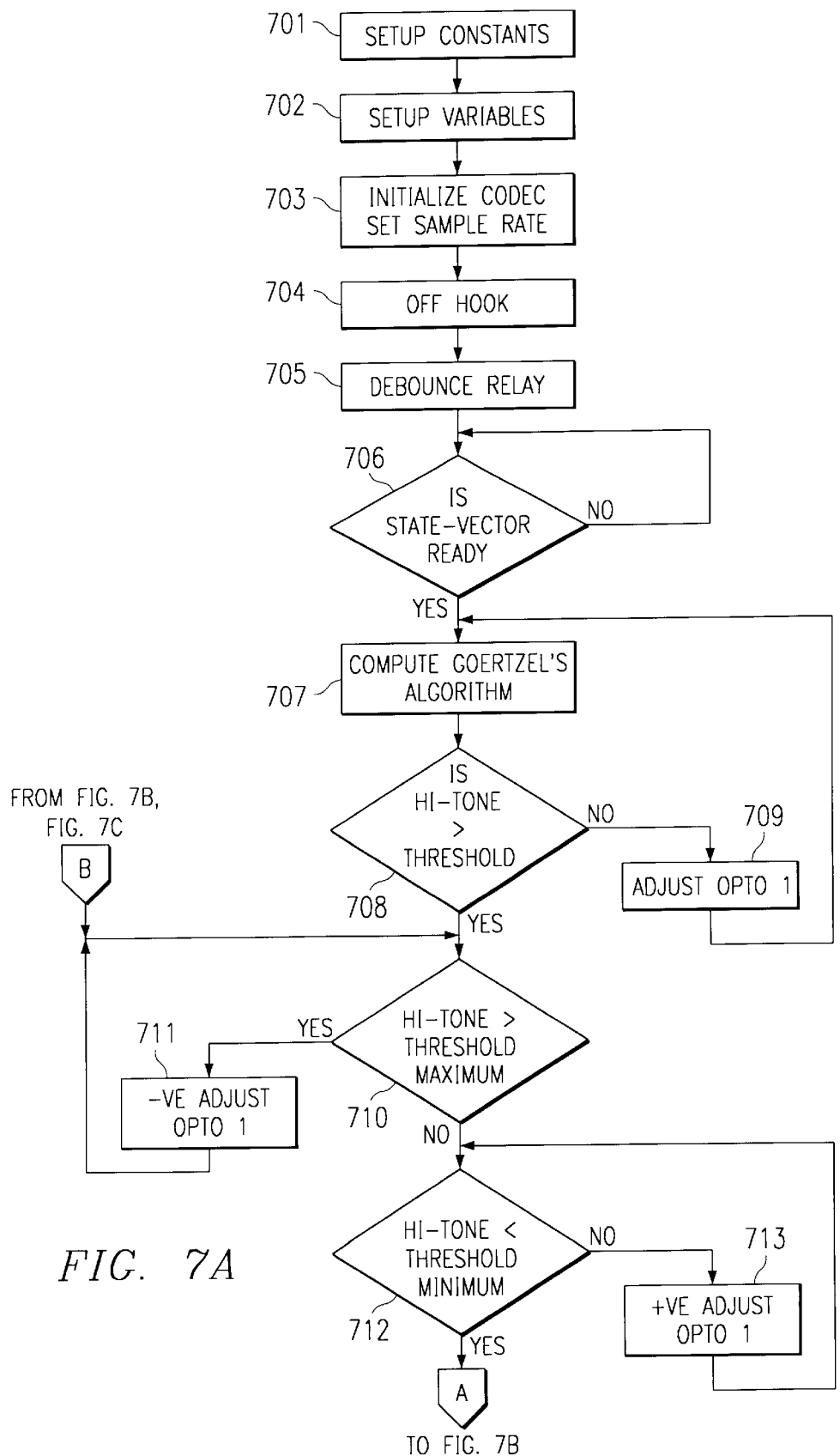
FIG. 7 is a flowchart showing the steps performed in the present invention.
Figure 7B:
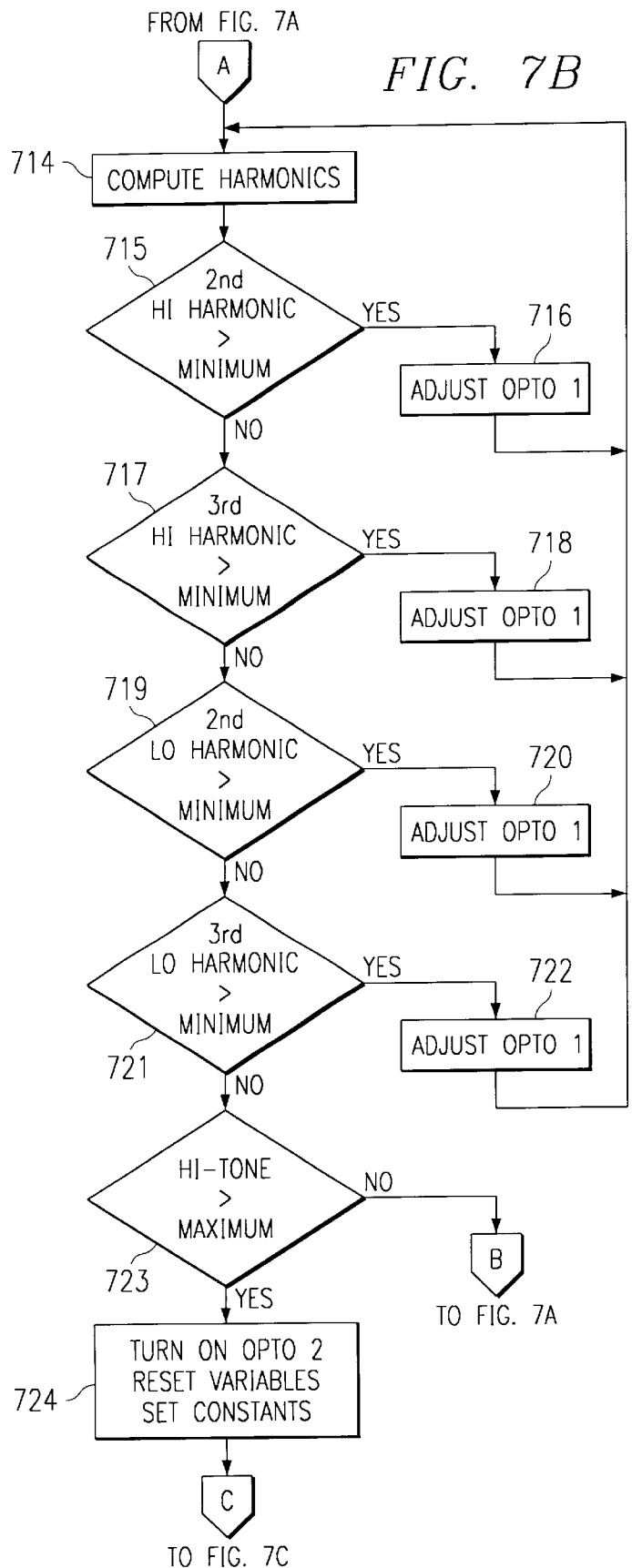
Figure 7C:
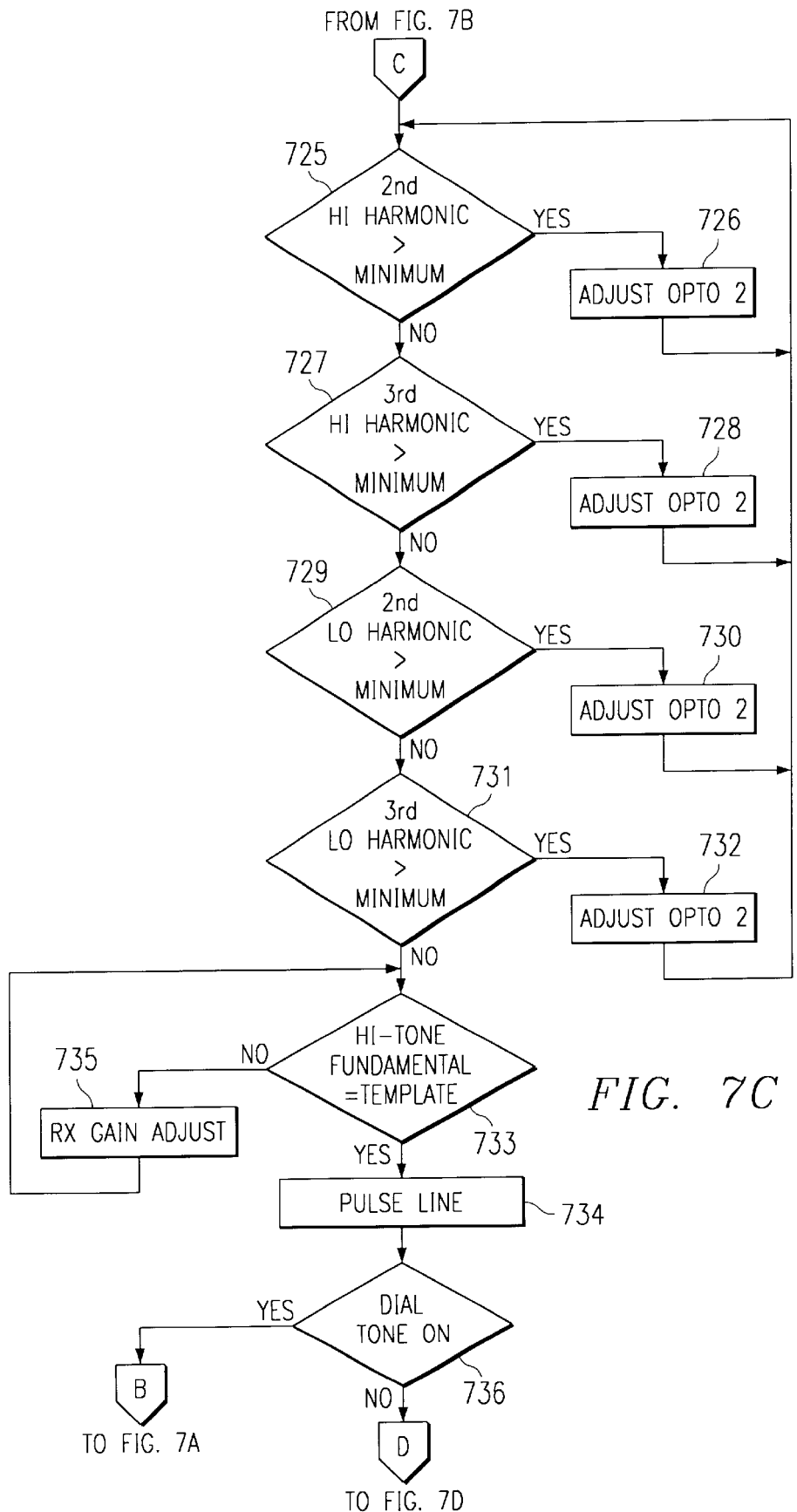
Figure 7D:
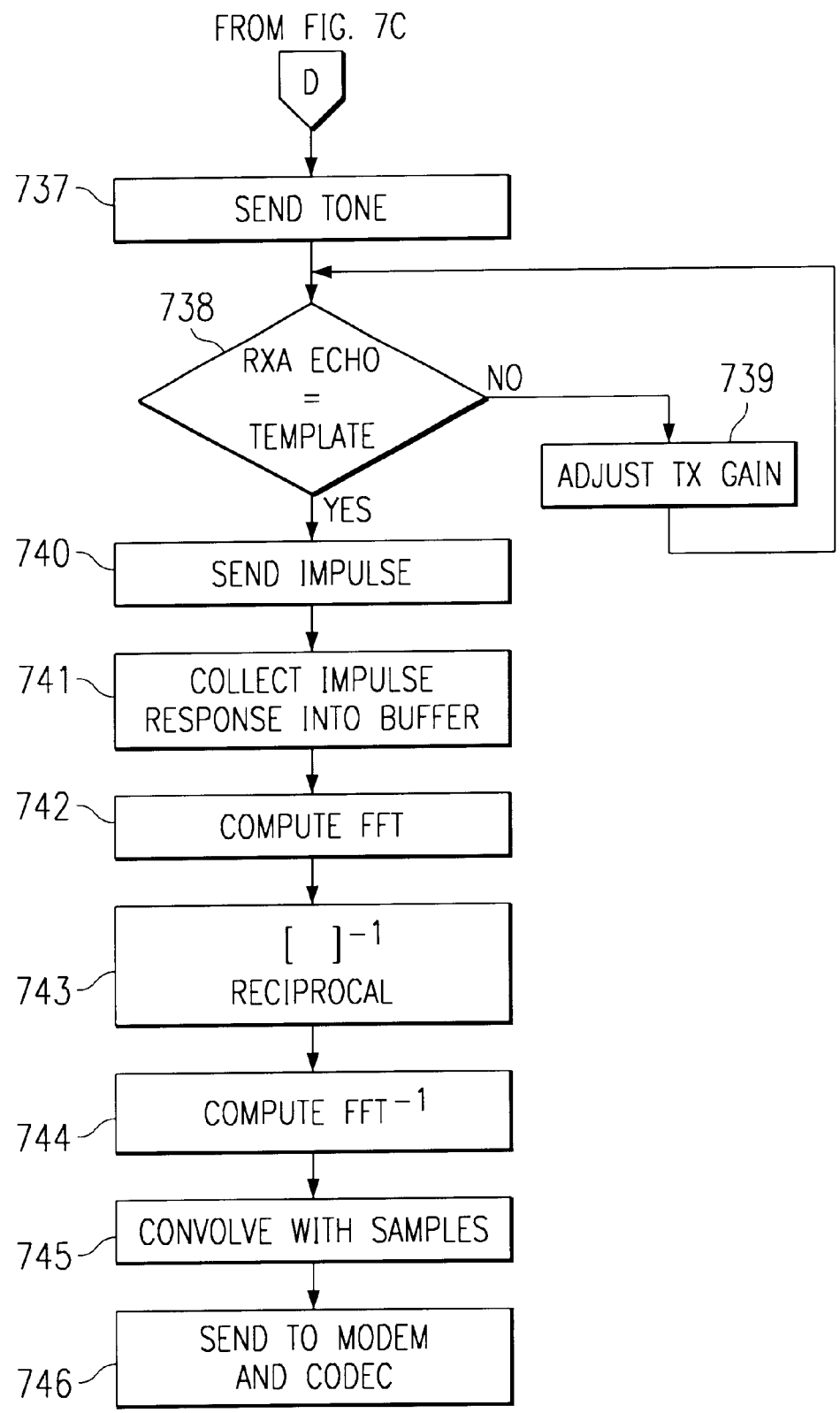

In another embodiment shown in FIG. 6B, DSP 17 can generate the pulse signal $V_{P1}$ or $V_{P2}$ which is provided to RC filters 74 and 75. The DC output of filters 74 and 75 can then be applied to circuit 20 as voltages $V_1$ or $V_2$. DSP 17 can generate signals $V_{P1}$, and $V_{P2}$ using a standard DSP input/output port 17a or 17b. Typically, a DSP can generate a digital signal having a value of either 0 or 5 volts. By changing the frequency or pulse interval of these digital signals, DSP can create a pulse wave $V_{P1}$ that has an average voltage $V_1$ which can be provided as a control voltage after it is rectified by filter 74.

The collector of optical coupler 203 receives a constant DC voltage $V_{BIAS}$ and the voltage across diode 204 is $V_{RD}$. In circuit 20, the AC voltage across forward diode 204 of optical coupler 203 is $V_{RD}$ which can be represented as:

$$V_{RD} = V_{RL} + V_{TX2}\alpha_2 - V_{TX1}\alpha_1 \quad (2)$$

where the AC voltage of the received signal at Tip 21 and Ring 22 is $V_{RL}$. The received signal at node 23, $V_{RXA}$, can be represented by the equation:

$$V_{RXA} = V_{RD}\beta = i_R Z_{R3C3} \quad (3)$$

The voltage across the collector and emitter of optical coupler 201 can be expressed as:

$$V_{TX1}\alpha_1 = V_{TXA}\left[\frac{Z_{R1C1}}{R_4 \| R_{FD1} + Z_{R1C1}}\right]\alpha_1 \quad (4)$$

where $Z_{R1C1}$ is the complex series impedance of 2R1 and 2C1, $R_{FD1}$ is the resistance across forward diode 205 and $V_{TXA}$ is the input transmit signal at node 25. Similarly, for optical coupler 202:

$$V_{TX2}\alpha_2 = V_{TXA}\left[\frac{Z_{R2C2}}{R_5 \| R_{FD2} + Z_{R2C2}}\right]\alpha_2. \quad (5)$$

Impedance $Z_{TR}$ presented by circuit 20 at Tip 21 and Ring 22 can be represented by the equation: $Z_{TR} = V_{TR}/I_L$, where $V_{TR}$ is the voltage across Tip 21 and Ring 22. As discussed earlier, $I_L = I_1 + I_2$. Currents $I_1$ and $I_2$ can be represented by the equations:

$$I_1 = \left(\frac{V_1 - V_{FD1}}{R_4}\right)\alpha_1, \text{ and} \quad (6)$$

$$I_2 = \left(\frac{V_2 - V_{FD2}}{R_5}\right)\alpha_2, \quad (7)$$

where $V_{FD1}$ and $V_{FD2}$ are the voltages across forward diodes 205 and 206.

If we let $V_K = (V_1 - V_{FD1}) = (V_2 - V_{FD2})$, then:

$$I_1 = \frac{V_K}{R_4}\alpha_1 \quad (8)$$

and $$I_2 = \frac{V_K}{R_5}\alpha_2. \quad (9)$$

Impedance $Z_{TR}$ can be simplified to:

$$Z_{TR} = \frac{V_{TR}}{\left(\frac{V_K}{R_4}\right)\alpha_1 + \left(\frac{V_K}{R_5}\right)\alpha_2}. \quad (10)$$

It can be seen from the above equation that by varying the values of ($V_K/R_4$) and ($V_K/R_5$), the impedance $Z_{TR}$ presented at Tip 21 and Ring 22 can be controlled. As discussed above, in the preferred embodiment, $V_1$ and $V_2$ can be adjusted using pulse wave modulator 71 or by modifying the signal from an input/output port in DSP 17. As shown by the above equations, DSP 17 can also change the impedance $Z_{TR}$ at Tip 21 and Ring 22 by varying the voltage $V_1$ and $V_2$ across $R_4$ and $R_5$.

The present invention takes advantage of this capability by monitoring harmonics of the dial tone frequency to detect an impedance mismatch and by varying the voltages at $V_1$ and $V_2$ until the harmonics have been removed. When the dial tone harmonics have been removed, then system 10 will be matched to line 11.

In an initial state, voltages $V_1$ and $V_2$ are zero. This creates an open circuit at optical couplers 201 and 202. When switch 12 is closed and system 10 goes off-hook, the central office detects the connection and sends a dial tone on telephone line 11. As discussed above, this dial tone will fit a specified template which will vary from country to country. In the United States the dial tone has frequencies at 350 Hz and 440 Hz. Since both optical 201 and 202 are open, current $I_L$ will not immediately begin to flow in circuit 20 after system 10 goes off-hook. System 10 first allows the relay to debounce at switch 12 so that the signal on at Tip 21 and Ring 22 stabilizes.

DSP 17 monitors the received signal at $V_{RXA}$. However, no signal should be detected until current $I_L$ begins to flow. In the preferred embodiment, DSP 17 initially applies a voltage at $V_1$ in the manner discussed above. By varying the pulse wave modulator, the voltage at $V_1$ can be precisely controlled. The voltage at $V_1$ is increased in 100 mV steps in the preferred embodiment, however, the step size is variable and can be changed depending upon the algorithm used. In another embodiment, one of DSP 17's I/O ports can be used to generate the voltage for $V_1$. This would eliminate the need for a separate pulse wave modulator. In an additional embodiment, a constant voltage could be provided to a digitally controlled resistor (not shown) and DSP 17 could control the resistor via a data bus (not shown).

As DSP 17 raises the voltage level at $V_1$, forward diode 205 eventually begins to conduct current $I_{F1}$. In turn, current $I_{F1}$ will allow current $I_1$ to flow through optical coupler 201. Since optical coupler 202 is still an open circuit, at this time all of the dial tone signal current $I_L$ will flow through optical coupler 201 as current $I_1$. As current $I_1$ flows through diode 204, voltage $V_{RD}$ develops across diode 204 and the dial tone signal is passed to node 23 as $V_{RXA}$. The $V_{RXA}$ signal passes through codec 16 and is detected by DSP 17.

Figure 4:
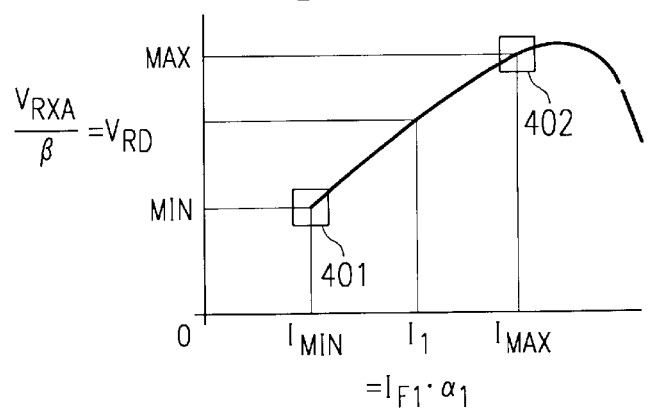
FIG. 4 is a graph showing the voltage across a photodiode of the present invention versus the current through the diode.

FIG. 4 is a graph which illustrates the relationship between current $I_1$ and voltage $V_{RD}$. Point 401 represents the minimum current level in $I_{F1}$ that is required to allow current $I_1$ to flow through optical couplers 201 and 203. Once the minimum current is applied, voltage $V_{RD}$ appears across diode 204 which in turn allows the dial tone signal to pass to $V_{RXA}$ 23. DSP 17 continues to increase voltage $V_1$ in 100 mV steps while monitoring the increasing voltage at $V_{RD}$. Eventually, as shown by point 402 in FIG. 4, voltage $V_{RD}$ will reach a maximum value and begin to fall off with increasing current $I_1$. By comparing each $V_{RD}$ sample with the previous sample, DSP 17 can detect point 402 at which $V_{RD}$ is maximum.

The step size by which voltage $V_1$ is varied will determine how accurately DSP 17 determines peak 402. If a small step size is used, many more samples will have to be taken and more time will be required to reach peak 402. Although this would be more accurate, the time required for additional samples presents a problem if system 20 relies on a central office dial tone. Typically, the central office will only send the dial tone for 10 to 15 seconds after detecting an off-hook condition. After that time, the central office will send some kind of alert tone or message inquiring if the caller needs assistance. Therefore, system 10 is limited by the duration of the dial tone.

In an alternative embodiment, system 10 may be modified to use some other signal on transmission line 11. For example, if more time was required to properly match impedances, system 10 could connect to a third party, such as another modem or computer, without performing the impedance match or after performing a rough match. Then, once the third party connection was completed, the third party could send a tone on telephone line 11 which system 10 could use either to perform an initial impedance match or to fine tune the impedance match.

DSP 17 stops increasing current $I_{F1}$ once peak 402 is determined. At that point DSP 17 analyzes the signal at $V_{RXA}$. If system 10 is not matched to line 11, which is the most likely case, then DSP 17 will detect signals both at the fundamental frequencies of 350 Hz (Lo Tone) and 440 Hz (Hi Tone) and at harmonics of those frequencies. For example, DSP 17 may detect Lo Tone harmonics at 700 Hz, 1050 Hz, 1400 Hz etc. and Hi Tone harmonics at 880 Hz, 1320 Hz, 1760 Hz etc.

While maintaining $V_1$ at the level which produces $V_{RDmax}$, DSP 17 measures the signal level at the fundamental and harmonic frequencies. DSP 17 also measures the noise level and compares the harmonics to the noise level. In a preferred embodiment, the noise level in circuit 20 would be at −65 to −70 dB.

After measuring the signal and noise at $V_{RDmax}$, DSP 17 begins to reduce the voltage at $V_1$. By reducing $V_1$, the related voltages at $V_{RD}$ and $V_{RXA}$ will also drop. In the preferred embodiment, $V_1$ is lowered in approximately 50 mV steps. However, any step size can be selected depending upon time and accuracy considerations. After each lowering step, DSP 17 again measures the fundamental and harmonic signals and determines the ratio of the harmonic components to the noise level. In the best case, the voltage at $V_1$ is reduced until the harmonic signal level is driven into or below the noise level. Generally, the primary concern in matching the circuit will be the first and second harmonics; that is 700 Hz and 1050 Hz for Lo Tone and 880 Hz and 1320 Hz for the Hi Tone. Higher harmonics can also be monitored, but harmonics above 4 kHz will fall outside the bandwidth of system 10. Once DSP 17 has detected that the first and second harmonics have dropped to the lowest point, the voltage of $V_1$ will be set and no further adjustments will be made at that time. Ideally, the harmonics will be at the noise level, but in some situations DSP 17 will have to accept some minimum harmonic amplitude that is above the noise level of circuit 20.

Figure 3B:
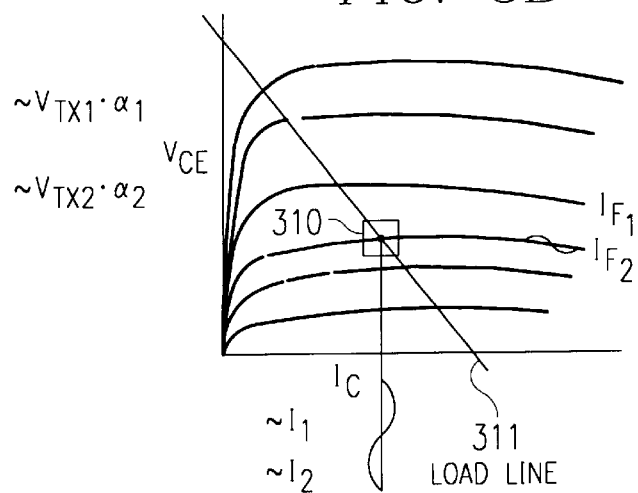
FIG. 3B is a graph showing the voltage across a photodetector versus the current through the photodetector for varying photodiode currents.

Referring to FIG. 3B, when the harmonics of the reference signal have been reduced to a minimum level, optical coupler 201 will be at a quiescent point 310 on load line 311. This is the point which allows the maximum amplitude in AC current $I_C$ without clipping.

At this point, DSP 17 turns on voltage $V_2$ and brings optical coupler 202 into the circuit. Voltage $V_2$ is increased in 100 mV steps and the output at $V_{RXA}$ is monitored at each step. As $V_2$ increases, current $I_2$ increases in a manner similar to the control of $I_1$ discussed above. The harmonics are monitored at $V_{RXA}$ after each increase in $V_2$. If the harmonics begin to appear above the noise level or the minimum level set by $I_1$, then DSP 17 stops adjusting $I_2$.

Optical coupler 201 controls the receive side of circuit 20 and optical coupler 202 controls the transmit side. Since current $I_L$ splits into currents $I_1$ and $I_2$, as current $I_2$ is increased, current $I_1$ decreases proportionately. In the ideal case, DSP 17 increases $V_2$ to a point at which $I_2$ equals $I_1$. This situation would provide for approximately balanced gain levels through circuit 20 on both the receive and transmit sides. If $\alpha_1$ and $\alpha_2$ are not equal, different values of $V_1$ and $V_2$ are required to match $I_1$ to $I_2$. In situations where $I_1$ and $I_2$ are not equal, the gain on the transmit side of the circuit can be varied by adjusting the values of 2R1 and 2R2 as discussed above.

It will be understood that there are other search methods that can be used by DSP 17 to adjust voltages $V_1$ and $V_2$ while keeping the dial tone harmonics in the noise level. For example, once $V_1$ is set and $I_1$ is determined, instead of stepping $V_2$ up from zero volts, $V_2$ could be set so that $I_2$ is approximately half of that $I_1$ value. At that point, the harmonics could be evaluated with respect to the noise level and adjustments to the circuit could be performed if necessary. In other cases, it may be desirable to readjust voltage $V_1$ and current $I_1$ after voltage $V_2$ is set. This procedure would provide a fine-tuning capability if required. However, time considerations may prevent additional adjustments. These and other methods of varying voltages $V_1$ and $V_2$ can be used while monitoring the dial tone harmonics in order to determine if circuit 20 and system 10 are matched to line 11.

Once values of $V_1$ and $V_2$ have been determined and set so that the dial tone harmonics are in the noise level or at their lowest point, then circuit 10 has an optimal impedance match with line 11. Also, at this point, the signal at $V_{RXA}$ should comprise only the fundamental dial tone frequencies of the central office dial tone template.

DSP 17 also provides gain compensation for the received signal. The signal level at $V_{RXA}$ may be below the template level of −13 dB due to loss in circuit 20. Codec 16 provides gain for the received signal so that the signal can be amplified back to the template level at $V_{RXD}$. This loss correction effectively cancels the effects of β in optical coupler 203. As a result, the gain needed to bring $V_{RXA}$ back up to the template level will effectively equal the value of β.

DSP 17 also compensates for transmission signal gain in circuit 20. The FCC requires that signals transmitted on telephone line 11 do not exceed −9 dB. Signals input at $V_{TXA}$ 25 will be amplified as they pass through circuit 20 to Tip 21 and Ring 22. Optical couplers 201 and 202 have a very high gain on the order of 1000. So signals from DSP 17 are on the order of −20 to −25 dB at $V_{TKA}$ 25 to prevent high signal levels at Tip 21 and Ring 22. By controlling the level of the digital signal transmitted into circuit 20, DSP 17 can control the signal level at Tip 21 and Ring 22. In the preferred embodiment, the signal level transmitted at Tip 21 and Ring 22 is on the order of −11 or −12 dB to ensure that FCC requirements are met.

Signals that; are input at $V_{TXA}$ 25 are passed through the circuit to $V_{RXA}$ 23 as an echo. The echo signal level at $V_{RXA}$ is dependent upon the differential between the signal that passes through optical couplers 201 and 202. This is the voltage across diode 204 and can be represented by the differential voltage: $(V_{TX1} \cdot \alpha_1 - V_{TX2} \cdot \alpha_2)$. When the values of $V_{TX1} \cdot \alpha_1$ and $V_{TX2} \cdot \alpha_2$ are equal, then the echo at $V_{RXA}$ is canceled. The values of $V_{TX1} \cdot \alpha_1$ and $V_{TX2}$ can be adjusted by varying the values of 2R1 and 2R2. As discussed above, these resistance values can be embodied as either a physical variable resistor or as a software model that varies the gain in the transmit channels of codec 16.

In the preferred embodiment, a 1400 Hz signal is input to $V_{TXA}$ and the echo at $V_{RXA}$ is monitored while the value of 2R2 is adjusted. The value of 2R1 remains constant while 2R2 is adjusted to suppress the 1400 Hz echo at $V_{RXA}$. Although some signal echo will be present at $V_{RXA}$, the present invention is capable of suppressing the echo to the −20 to −25 dB range.

DSP 17 can begin processing signals in system 10 after optical couplers 201, 202 and 203 have been biased to eliminate harmonics and after circuit 20 has been adjusted to set the gain levels and eliminate echoes. The transmitted and received signals processed by DSP 17 will be distorted as they pass through circuit 20. If optical hybrid 20 was a static circuit, a single transfer function could be calculated to compensate for this distortion. However, each time system 10 and circuit 20 are adjusted to match a new $Z_L$ on transmission line 11, the transfer function of circuit 20 changes. The modifications of voltages $V_1$ and $V_2$ and resistances $R_1$ and $R_2$ during the impedance matching, gain calibration and echo cancellation steps result in a new transfer function for each impedance match.

The signal detected by DSP 17 at $V_{RXA}$ is equivalent to the signal at $V_{RL}$ after it has been distorted by the transfer function $H_{TR}(t)$ of optical hybrid circuit 20. DSP 17 compensates for the transfer function's effect on $V_{RL}$ by determining the transfer function of circuit 20 each time it is matched to a new $Z_L$. The transfer function is then inverted and the inverse transfer function is used to compensate for the distorted received signals at $V_{RXA}$ 23. Transmitted signals are predistorted before they are input to circuit 20 at $V_{TXA}$ 25.

Figure 5:
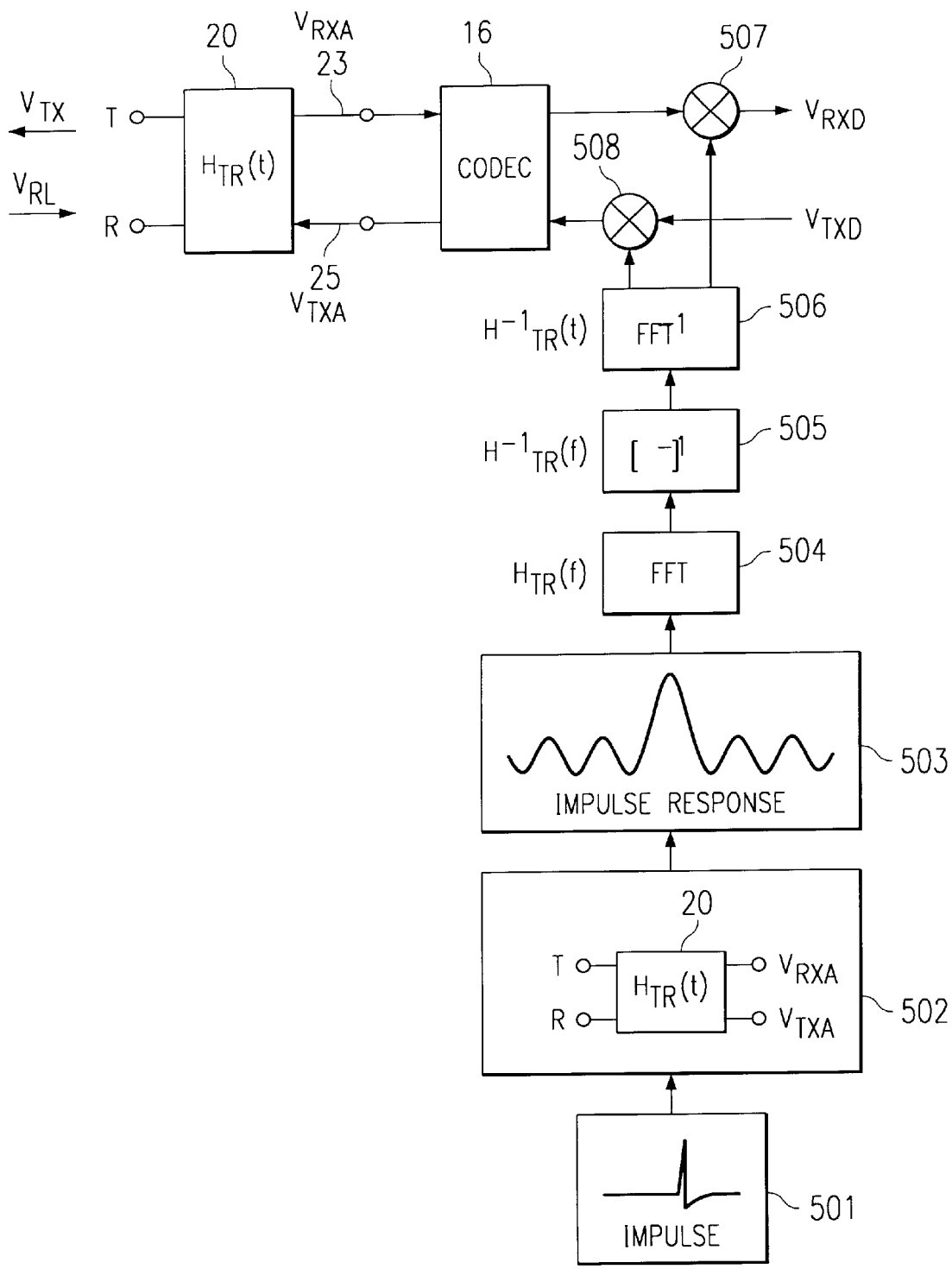
FIG. 5 is a block diagram of the functions performed in the processor of the present invention in order to compensate for distortion in the matching circuit.

FIG. 5 is a block diagram representing the steps performed by DSP 17 in order to compensate for signal distortion in circuit 20. Block 501 represents the generation of an impulse by DSP 17. In the preferred embodiment, the sampling rate of codec 16 is selected as the frequency of the impulse signal. DSP 17 generates the impulse signal by stepping from a zero signal value to the highest digital signal value and then back to zero. This impulse signal is then input into circuit 20 at $V_{TXA}$ 25 as shown in block 502.

Optical hybrid 20 has a transfer function that can be represented by $H_{TR}(t)$. A output from circuit 20 which corresponds to the impulse input is detected at $V_{RXA}$ by DSP 17. Because of the echo canceling step described above, the impulse response signals at $VI_1$ will be suppressed to −20 to −25 dB, however DSP 17 will be able to detect the impulse response at this level. DSP 17 samples the output at $V_{RXA}$ to get the impulse response represented by block 503. The impulse response is a time domain representation of transfer function $H_{TR}(t)$ of optical hybrid 20. It will be understood that the actual $H_{TR}(t)$ function does not have to be calculated in the present invention. The impulse response samples are processed in block 504 where DSP 17 performs a Fourier transform on the impulse response samples to generate a frequency domain transfer function H(f) for optical hybrid 20.

The frequency-domain transfer function is inverted in block 505 by DSP 17. This creates inverted transfer function $H_{TR}^{-1}(f)$ in the frequency domain. In block 506, DSP 17 then performs an inverse Fourier transform on frequency domain transfer function $H_{TR}^{-1}(f)$ to generate an inverse time domain transfer function $H_{TR}^{-1}(t)$ for optical hybrid 20.

The inverse time domain transfer function $H_{TR}^{-1}(t)$ is then convolved (507) with received signal $V_{RXA}$ to recover the original undistorted signal at $V_{RL}$. On the transmission side, DSP 17 predistorts transmitted signals using inverse transfer function $H_{TR}^{-1}(t)$ before inputting the signal into optical hybrid circuit 20 at $V_{TXA}$. Transmitted signal $V_{TXD}$ is convolved (508) with inverse transfer function $H_{TR}^{-1}(t)$ and then input to $V_{TXA}$ 25. As the transmitted signal passes through optical hybrid 20, the effects of the predistortion are canceled out by the transfer function of circuit 20. The transmitted signal that appears at Tip 21 and Ring 22 is an undistorted version of $V_{TXD}$.

In one embodiment, DSP 17 records the impedance matching and distortion correcting parameters in a memory device. This allows system 10 to immediately match the impedance of telephone line 11 at the initiation of the next call. The recorded parameters could also be used as a starting point for an impedance match and circuit 20 could be further adjusted from the recorded parameters for a fine tuned impedance match. This capability would be useful in the situation where system 10 is always connected to the same line 11, such as in a personal computer connected to the same telephone line or in a computer connected to the same data line.

FIG. 7 is a flowchart illustrating the steps performed in the present invention. DSP 17 sets up constants, such as the dial tone template, in step 701. In step 702, variables for the DSP software are setup and initialized. Codec 16 is initialized in step 703. Switch 12 closed in step 704 and the relay is allowed to debounce in step 705. Step 706 checks the state-vector to determine if all of the variables and constants have been set and if the system is off-hook. When all initialization steps are complete, then the system moves to step 707 in which the system calculates Goertzel,'s algorithm for use during operation.

In step 708, the Hi-Tone, such as 440 Hz in the United States, is detected and compared to a threshold value and optical coupler 201 is adjusted in step 709 if Hi-Tone is less than the threshold. If Hi-Tone is greater than a maximum value in step 710, then optical coupler 201 is adjusted in step 711. Hi-Tone is compared to a minimum threshold in step 712 and optical coupler 201 is readjusted in step 713 if Hi-Tone is below the minimum value. In steps 708 to 713 system 10 is determining the maximum value of $V_{RD}$ as described above.

In step 714, DSP 17 calculates the harmonics of the Hi-Tone and Lo-Tone signals (3,50 Hz and 440 Hz). The levels of the Hi-Tone and Lo-Tone harmonics are detected and compared to minimum values in steps 715, 717, 719 and 721. In the preferred embodiment, system 10 monitors the second and third harmonics (700 Hz, 1050 Hz, 880 Hz and 1320 Hz) while adjusting the impedance. If any of the harmonics are above the minimum level, then optical coupler 201 is adjusted in the corresponding step 716, 718, 720 or 722. In steps 715 to 722, optical coupler 201 is adjusted in the manner described above so that the harmonics of the Lo-Tone are driven to a minimum level.

After adjusting circuit 20 for the Lo-Tone, DSP 17 moves to step 723 to adjust for the Hi-Tone harmonics. If Hi-Tone is above a maximum in step 723, then optical coupler 202 is turned on and the software variables and constants are reset in step 724. If Hi-Tone is not above the maximum, then DSP 17 moves to step 710 and repeats steps 710 to 722. In steps 725 to 731, DSP 17 monitors the Hi-Tone and Lo-Tone harmonics and compares them to a minimum level while adjusting optical coupler 202. If any of the harmonics are above the minimum level, then optical coupler 202 is adjusted in steps 726, 728, 730 and 732 to reduce the harmonic amplitude.

After suppressing the harmonics, the fundamental signals are compared to the telephone company template in step 733. If the amplitude is below the template value, then the gain in the receive channel is adjusted in step 735. Once the receive gain is set, then pulses, such as dual tone multifrequency (DTMF) signals can be sent on the telephone line in step 734. In step 736, DSP 17 checks to determine if the dial tone is still on the line and returns to step 710 if the dial tone signal is detected. Otherwise, DSP 17 initiates the signal balancing and echo cancerization in step 737.

As discussed above, DSP 17 sends a tone, preferably at 1400 Hz, on $V_{TXA}$ in step 737 and then monitors the echo on $V_{RXA}$ in step 738. If the echo does not equal the template, then the transmit gain is adjusted in step 739 until the echo signal is suppressed to at least −20 dB.

Steps 740 to 744 relate to the determination of the inverted time domain transfer function of circuit 20. An impulse is generated in DSP 17 and transmitted into circuit 20 in step 740. The impulse response is detected and sampled into a buffer in step 741. The Fourier transform of the impulse response is completed in step 742 to get the frequency domain transfer function of circuit 20. In step 743, the reciprocal of the frequency domain transfer function is taken and it is inverse Fourier transformed in step 744. This creates a transfer function which is the inverse of circuit 20's transfer function. In step 745, the transfer function is convolved with the signals that are transmitted or received by DSP 17 to correct for the distortion effects of circuit 20 and system 10. In 746, the DSP transmits signals through codec 16 and performs modem functions on received signals.

Other embodiments of the present invention could use a different reference signal instead of a dial tone. For example, two computers or processors that are linked by a data line could match impedances to the data line using the present invention. One computer could provide a signal of any predetermined frequency and amplitude to be used by the other computer for an impedance matching reference signal. Other telephone signals (could also be used, such as the warning tone that is broadcast by the central office after the dial tone times out. In such a case, if the circuit is not matched before the dial tone is removed from the line, then the circuit could switch templates and use an template for the off-hook alert tone that is sent by the central office.

Optical hybrid 20 can be designed so that some of the other components of system 10 will not be required. For example, electronic inductor 14 can be replaced by using the base connection of optical coupler 202. An induction circuit can be constructed by connecting one resistor between the base and tip and another resistor between the base and ring. Optical conductor 202 can then be biased to provide the initial off-hook current flow that is required to notify the central office that a device has connected to the line.

In other embodiments, the impedance matching functions of DSP 17 can be replaced by a programmable logic device which is programmed to run the impedance matching steps.

System 10 can also be used for ring detection. In the prior art, a separate circuit is connected across tip and ring to detect the ring signal while switch 12 is open. If a voltage was applied to $V_1$ of optical coupler 201, then current would flow through the receive portion of circuit 20 and AC signals, such as a ring signal, could pass resistor 1R1 and capacitor 1C1. The ring signal would then be detectable by DSP 17 which could perform any number of operations on the ring signal. For example, DSP 17 could be used for distinctive ringing operations wherein a different ring cadence is used to identify different calling parties or different telephone lines. DSP 17 can monitor the ring pulses and compare these to a known pattern of ring pulses to identify the specific ring signal.

Ring detection could also be used for Caller ID services. Typically, Caller ID information is provided as frequency shift keyed (FSK) data between the individual ring signals. If the ring signal and Caller ID is passed through optical coupler 203 to DSP 17, then DSP 17 can interpret the FSK data and identify the calling party. The Caller ID information could be provided by DSP 17 without the need for another separate device connected to the same tip and ring lines as system 10.

The isolation of the present invention also provides system 10 and DSP 17 protection from current surges on line 11. The optical couplers have an isolation of approximately 4 kV. In the prior art, surge protection was provided by a device, such as a metal oxide varistor (MOV), connected in parallel across tip and ring. Lightening strikes or other electrical surges would be shorted out through the MOV. In the present invention, the high isolation of the optical couplers would provide surge protection without the need for additional devices.

Although the present invention and its advantages have been described in detail, it should be understood that various changes, substitutions and alterations can be made herein without departing from the spirit and scope of the invention as defined by the appended claims.

What is claimed is:

1. A system for matching the impedance of a device to the impedance to a transmission line, said system comprising:

a first optocoupler connected in parallel across a transmission line with the series connection of a second optocoupler and a third optocoupler;

a photodetector of said second optocoupler coupled to a receive output;

a transmit input coupled both to a photoemitter of said first optocoupler and a photoemitter of said third optocoupler;

wherein a first variable voltage is applied to said third optocoupler's photoemitter to generate current in said second and third optocouplers; and wherein a second variable voltage is applied to said first optocoupler's photoemitter to generate current in said first optocoupler.

2. The system of claim 1 further comprising:

a digital signal processor (DSP) communicating with said receive output and said transmit input, said DSP operable for controlling said variable voltages.

3. The system of claim 2 further comprising:

a codec coupled between said receive output and said digital signal processor and between said transmit input and said digital signal processor.

4. The system of claim 2 wherein a reference signal is provided on said transmission line and wherein said digital signal processor monitors harmonics of said reference signal at said receive output to establish said variable voltages.

5. The system of claim 1 wherein a digital signal processor controls at least said first variable voltage in a series of steps.

6. The system of claim 5 wherein said digital signal processor adjusts said first variable voltage in order to reduce an amplitude of said reference signal harmonics monitored at said receive output.

7. The system of claim 5 wherein said digital signal processor adjusts said second variable voltage in order to reduce an amplitude of said reference signal harmonics monitored at said receive output.

8. The system of claim 5 wherein said first and second variable voltages are adjusted so that the gain through said impedance matching system is balanced for received and transmitted signals.

9. The system of claim 1 further comprising:

a low pass filter coupled between said second optocoupler photodetector and said receive output.

10. The system of claim 9 wherein said low pass filter comprises:

a resistor and a capacitor selected to eliminate noise above a selected bandwidth.

11. The system of claim 1 further comprising:

a first coupling capacitor between said first optocoupler photoemitter and said transmit input;

a second coupling capacitor between said third optocoupler photoemitter and said transmit input;

a first gain resistor between said first optocoupler photoemitter and said transmit input; and a second gain resistor between said third optocoupler photoemitter and said transmit input.

12. The system of claim 11 wherein said first gain resistor is equivalent to a first codec channel gain and said second gain resistor is equivalent to a second codec channel gain.

13. A modem comprising:

means for connecting to a transmission line;

means, including at least one optically coupled device, for matching an impedance of said modem to an impedance of said transmission line; and signal processing means for monitoring at least one harmonic of a reference signal on said transmission line and for controlling said matching means, wherein said reference signal is a predetermined signal transmitted on a data line wherein said predetermined signal is transmitted over a data line between two processors and further wherein said matching means impedance is adjusted by said signal processing means so that said at least one harmonic is at a minimum level.

14. The modem of claim 13 further comprising:

means for correcting for a signal distortion in said modem.

15. The modem of claim 13 wherein said reference signal is a dial tone.

16. The modem of claim 13 further comprising:

means for recording impedance match parameters, wherein said parameters can be recalled upon a next connection to said transmission line.

17. The modem of claim 13 wherein a digital signal processor controls a bias voltage of said at least one optically coupled device.

18. The modem of claim 13 further comprising:

means for detecting a ring signal on said transmission line before said modem impedance is matched to said transmission line.

19. The modem of claim 13 further comprising:

means for detecting an identification signal on said transmission line before said modem impedance is matched to said transmission line.

20. The modem of claim 13 further comprising:

means for correcting for a received signal distortion, wherein said correction means removes a distortion caused by said matching means.

21. The modem of claim 13 further comprising:

means for correcting for a transmitted signal distortion, wherein said correction means predistorts a signal to be transmitted so that said predistortion is canceled when said predistorted signal passes through said matching means.

22. The modem of claim 13 further comprising:

means for suppressing an echo in said modem, wherein said suppressing means reduces said echo below a predetermined level.

23. A circuit for optically coupling a device to a telephone line, said circuit having a first port and a second port for connection to said telephone line and a receive port and a transmit port for connection to said device, said circuit comprising:

a first optical coupler comprising a first photoemitter and a first photodetector, said first photoemitter having an input and an output, wherein said first photoemitter input is coupled to said first port and wherein said first photodetector is coupled to said receive port; and a second optical coupler comprising a second photoemitter and a second photodetector, said second photodetector having a collector and an emitter, wherein said second photodetector collector is coupled to said first photoemitter output and said second photodetector emitter is coupled to said second port, and wherein said second photoemitter has an input coupled to said transmit port.

24. The circuit of claim 23 further comprising:

an electronic inductor coupled to said first and second optical couplers; and a diode bridge coupled between said electronic inductor and said telephone line.

25. The circuit of claim 23 further comprising:

a CODEC coupled to said receive and transmit ports; and a digital signal processor coupled to said CODEC.

26. The circuit of claim 23 wherein said first port is coupled to a tip connection on said telephone line and wherein said second port is coupled to a ring connection on said telephone line.

27. The circuit of claim 23 further comprising:

a third optical coupler comprising a third photoemitter and a third photodetector, said third photodetector having a collector and an emitter, wherein said third photodetector collector is coupled to said first photoemitter input and said third photodetector emitter is coupled to said second photodetector emitter; and wherein a third photoemitter input is coupled to said transmit port.

* * * * *